Jan. 16, 1962 R. A. RUNYAN 3,017,616

SYSTEMS FOR PROCESSING RECORDED INFORMATION

Filed June 21, 1955 2 Sheets-Sheet 1

INVENTOR.
RAYMOND A. RUNYAN
BY William P. Sherman
ATTORNEY

INVENTOR.
RAYMOND A. RUNYAN

BY William R. Sherman

ATTORNEY 3,017,616
Patented Jan. 16, 1962

3,017,616

SYSTEMS FOR PROCESSING RECORDED INFORMATION

Raymond A. Runyan, Ridgefield, Conn., assignor to Electro-Mechanical Research, Incorporated, Ridgefield, Conn., a corporation of Connecticut Filed June 21, 1955, Ser. No. 516,869
40 Claims. (Cl. 340—174.1)

This invention relates to systems for processing recorded information and, more particularly, to such systems for use where time modulated signals are recorded for subsequent playback.

In frequency multiplexed FM instrumentation systems employed, for example, in monitoring the operation of aircraft in flight, the received intelligence carriers are commonly recorded together with a reference frequency on a suitable medium such as magnetic tape. In a typical system of this character, a plurality of subcarriers are frequently modulated within respective channels in the audio and supersonic spectrum by A.C. or D.C. signals representing the data to be transmitted. These subcarrier signals then modulate the carrier wave generated by a transmitter. At a receiving station, the transmitted carrier wave is demodulated for recording of the composite subcarriers on magnetic tape together with the reference signal having a precisely controlled frequency. Upon subsequent playback of the tape, the subcarrier signals are separated by band pass filters and applied to FM discriminators to derive signals representing the transmitted data.

Because the subcarrier signals recorded on the magnetic tape represent data by a frequency deviation, variations in speed of the tape during either recording or playback result in data errors in each of the subcarrier channels. In past efforts to avoid this source of errors, elaborate and expensive drives for the magnetic tape have utilized the precise reference frequency signal recorded on the tape for servo control of the playback speed. Servo speed regulators of this type have successfully been applied to magnetic tape drives to eliminate "wow," that is, low speed variations. However, high frequency variations in speed, known as "flutter," have not been fully corrected by this technique, even where a heavy flywheel is coupled to the tape drive capstan.

In another commonly used tape speed compensation system, an error signal is derived from a frequency discriminator tuned to the reference frequency. This error signal, which is proportional to the tape speed variations, is subtracted from the outputs of the discriminators for the other subcarrier channels. In this manner, the error component in the reproduced data signals is made proportional to the ratio $\Delta f/f_0$ where $f_0$ is the center frequency of a subcarrier band or channel and $\Delta f$ is the frequency deviation from $f_0$. While at the center frequency the compensation is complete, the maximum improvement attainable at the band edges with a standard 7.5% deviation is a reduction in the error component by a factor of 13. A significant error thus remains in the data obtained.

An important object of this invention, therefore, is to provide new and improved systems for processing recorded information wherein errors arising from record speed variations are substantially nullified.

Another object of this invention is to provide new and improved systems for processing recorded time modulated signals with effective compensation for record speed variations over the full frequency band of such signals.

Still another object is to provide new and improved systems for reproducing recorded time modulated signals wherein record speed variations in recording and playback are effectively compensated without necessitating elaborate and expensive record speed regulation.

Yet another object of the invention is to provide new and improved systems for reproducing recordings of a plurality of subcarrier signals in which each of the subcarrier signals is compensated for record speed variations in a highly effective and relatively inexpensive manner.

These and other objects are attained, in accordance with the invention, by varying the center frequency to which a discriminator is tuned as a function of tape speed variations. In a particular embodiment, a frequency discriminator is provided for demodulating each recorded time modulated signal conveying intelligence. An additional discriminator is provided for detecting frequency variations in a reference signal which was recorded at a precisely controlled frequency along with the intelligence signal. As any speed variations in the record medium during recording of playback of the recorded signals will produce a corresponding frequency variation in the reference signal as it is played back, the output of the discriminator tuned to the reference frequency constitutes an error signal proportional to record speed variations. This error signal is supplied to the discriminator for each intelligence signal in a manner tending to produce a proportional variation in the center frequency to which such discriminator is tuned. The manner in which this error signal is supplied in time delayed relation, determined by uniform time delay characteristics of the particular discriminator channels, is an additional feature of the present invention, whereby errors due to record speed variations are substantially eliminated throughout the intelligence frequency band.

While a discriminator is provided in accordance with the invention that has a center frequency tuning conforming with substantial linearity to an applied error signal, provision is made in a modified embodiment of the invention to secure a linear retuning of an intelligence signal discriminator by applying feedback to the reference signal discriminator in the same manner that the error signal is applied to the intelligence signal discriminator.

Additional objects and advantages of the invention will become apparent from the following detailed description of a representative embodiment thereof, taken in conjunction with the accompanying drawings, in which.

Figure 1:
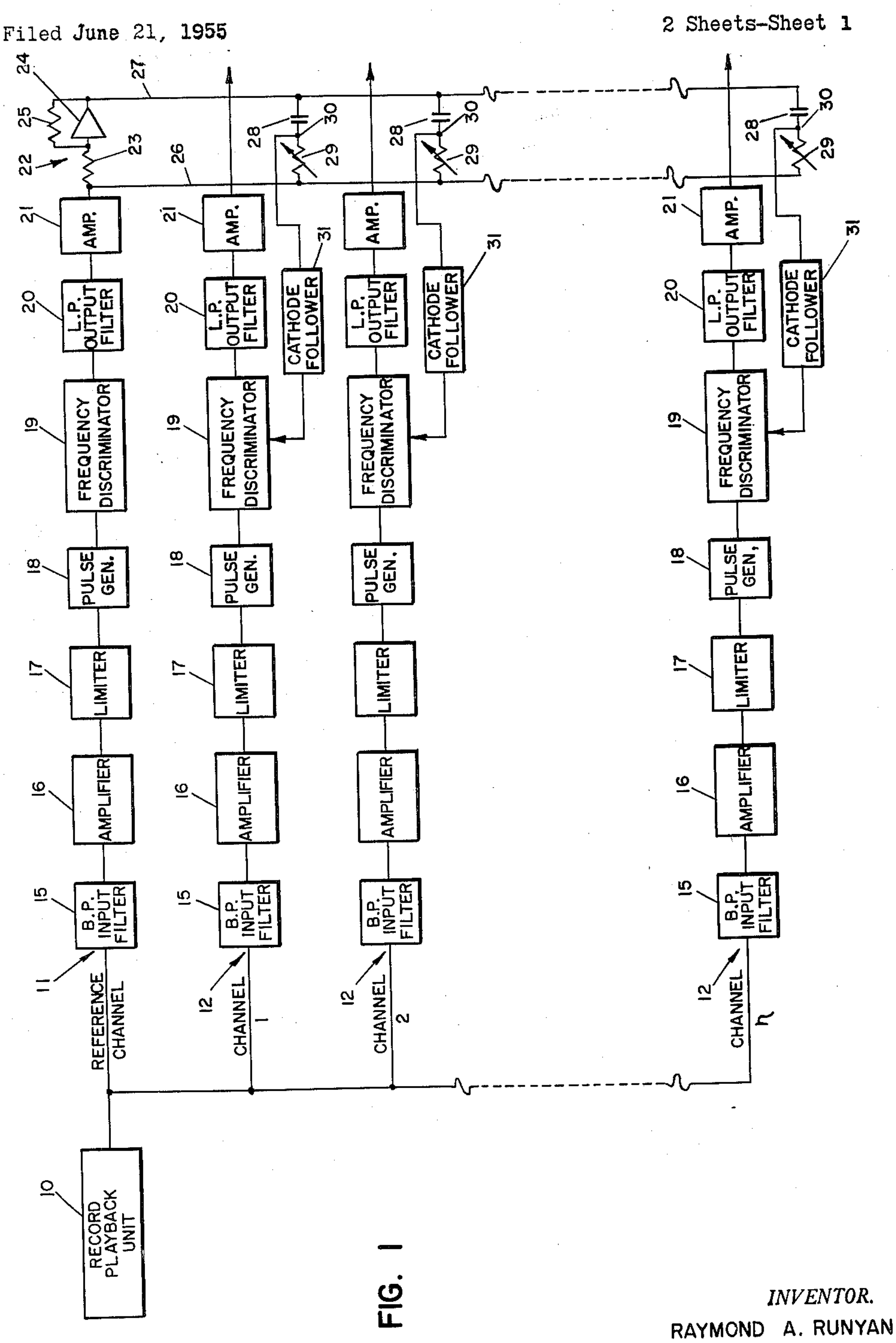
FIG. 1 is a block diagram schematically illustrating a data handling system in accordance with the invention.

In FIG. 1 is shown a system for handling recorded information signals such as might be obtained in an FM—FM telemetry system wherein a carrier signal is frequency modulated by a plurality of frequency modulated subcarriers. This system comprises a playback unit 10 for translating a signal recorded on a record medium into a time varying electrical signal. While the invention is adapted for use with a variety of record media including photographic film, grooved disks, and the like, the record medium used in a preferred embodiment of the invention is magnetic tape. For a reproduction of magnetic tape recordings, the playback unit 10 may comprise tape carrying spools, a drive mechanism including a tape drive capstan and a magnetic transducer for translating variations in magnetic intensity along the tape into electrical signals.

The recorded signal in an application of the invention to FM—FM telemetry includes a plurality of mixed FM subcarrier signals derived by demodulation of an FM carrier wave. Recorded concurrently by mixing with the subcarrier signals is a reference frequency signal, such as may be derived from a precision controlled oscillator (not shown). Each of the subcarrier signals may represent intelligence by frequency deviations $\Delta f$ from a center frequency $f_0$ of a subcarrier band. In a standard FM—FM telemetry system, a maximum frequency deviation of 7.5% defines the band or channel edges. The center frequencies for the subcarriers are spaced in the audio and supersonic frequency spectrums and may be modulated at frequencies between zero and the maximum frequency deviation. To facilitate a separation of the reference signal from the subcarrier or intelligence signals, the frequency of the reference signal is substantially displaced from the subcarrier center frequencies.

While the reference frequency signal is derived from a constant frequency source, its frequency upon playback is subject to a deviation proportional to the net speed deviation in recording and in playback of any given portion of the record medium. In other words, the playback signal is effectively frequency modulated by a signal proportional to the error introduced by tape speed variations in recording and playback of the record medium. In order to compensate for the error introduced by the modulating effect of record speed variations, there is provided in accordance with the invention a reference discriminator channel 11 as well as a plurality of subcarrier discriminator channels 12 corresponding to the number $n$ of subcarrier signals. All of these discriminator channels 11, 12 are connected in parallel to the output of the playback unit 10. Each of the discriminator channels, including the reference channel, comprises a band pass filter 15 for rejecting signals having a frequency outside the respective channel. It is important that any time delay introduced by the input filters 15 be substantially constant for all frequencies within the pass band of the particular channel. A variation in time delay over the pass band not exceeding 2% is desirable for realizing the full effectiveness of the compensation scheme according to this invention. The input filters should, moreover, provide a relatively smooth attenuation characteristic over the pass band. The filters suitably may comprise a number of stagger-tuned resonant inductor-capacitor combinations isolated from each other by cathode follower amplifier stages.

To the band pass input filter 15 in each channel is coupled an amplifier 16 followed by a limiter 17. The limiter 17 serves to convert the sinusoidal signal output of the amplifier 16 into a square wave signal of alternating polarity. The square wave signal output from the limiter 17 actuates a pulse generator 18 to produce a short pulse coinciding with the beginning of each cycle of the square wave signal. These short pulses have a time spacing inversely proportional to the frequency of the channel signal and are applied to a tunable frequency discriminator 19.

The discriminator 19 may have a variety of forms wherein center frequency tuning may be controlled by a signal. In a preferred embodiment, the discriminator is of the pulse-averaging trigger circuit type comprising a monostable multivibrator having a stable state and an unstable state. The application of a pulse to this type of discriminator produces a transition from the stable to the unstable state, return to the stable state occurring after substantially a fixed interval. Thus, discriminator 19 is designed to produce a negative pulse of constant time duration $T_1$ equal to one-half the period of the subcarrier center frequency $f_0$ each time it receives an actuating pulse from the pulse generator 18, after which it produces a positive pulse of variable time duration $T_2$ until the succeeding pulse from pulse generator 18 is received. The pulses of each polarity have the same fixed amplitude. Since the time duration $T_2$ is equal to the reciprocal of the signal frequency $f$ minus the time $T_1$, the pulse output of the discriminator 19 may be translated by integration into a demodulation version of the channel signal.

To obtain a signal varying as the integral of the pulses derived from the discriminator 19, a low pass output filter 20 is coupled to the output of the trigger circuit discriminator 19. The time varying signal derived from the output filter 20 is then a demodulated version of the channel signal. For securing a suitable output signal level, the demodulated signal output of filter 20 is supplied to an amplifier 21. Thus, the amplifier 21 for each of the discriminator channels 11, 12 provides an output signal which is the demodulated version of that component of the playback signal to which the channel is responsive. Since any time modulation of the reference frequency signal is attributable to record speed variations, the demodulated signal output for the reference discriminator channel 11 is an error signal proportional to the instantaneous speed variations occurring in both the recording and the playback of the recorded signals.

To compensate for the modulation errors affecting each of the subcarrier signals as a result of record speed variations, the error signal derived from the reference channel 11 is supplied to each of the discriminators 19 for the other subcarrier channels 12 to vary their tuning in linear proportion. The returning of the subcarrier discriminators 19 effected by the error signal may be considered a variation of the center frequency $f_0$ to which the various discriminators are tuned. In order that successive portions of the error signal may arrive at the subcarrier discriminators synchronously with portions of the subcarrier signals having a corresponding position on the record medium, provision is made for delaying the arrival of the error signal for various intervals corresponding to the delays encountered by the respective subcarrier signals in the input filters 15.

Accordingly, the output of the amplifier 21 in the reference discriminator channel is coupled to a delaying network comprising a so-called circle phase delay circuit 22. This circuit 22 includes an input resistor 23 for a D.C. operational amplifier 24 with unity gain. A feedback resistor 25, preferably identical in value to the input resistor 23, is coupled across the input and output circuits of the amplifier 24 to constitute a feedback circuit. In consequence, the output signal from the amplifier 21 is reproduced with accurate linearity as the output signal of the operational amplifier 24. These identical output signals are applied to parallel buses 26, 27 across which are connected phase adjusting circuits, each compromising a capacitor 28 and a variable resistor 29 in series, there being a phase adjusting circuit for each of said subcarrier channels 12. The signal at the junction 30 of each resistor 29 and capacitor 28 may be varied in phase by adjusting the resistor 29 or changing the value of the capacitor 28, without entailing a variation in amplitude. Each junction point 30 is coupled via a cathode follower 31 to the tuning circuit of the corresponding discriminator 19. Preferably, the gain of the cathode follower 31 is made adjustable in order that the strength of the error signal applied to each discriminator 19 may be adjusted to the characteristics of such discriminator.

Figure 2:
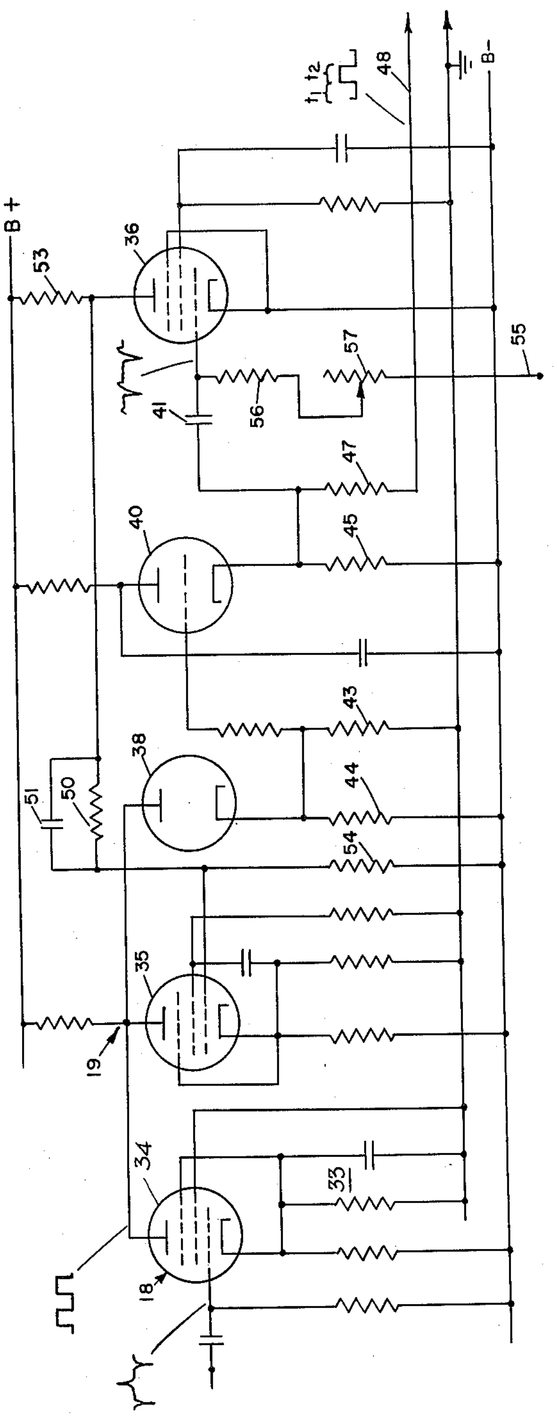
FIG. 2 is a circuit diagram of a discriminator which may be used in the system of FIG. 1.

While the frequency discriminator 19 may have a variety of forms, there is shown in FIG. 2 the circuit diagram of a frequency discriminator preferred for use in the system of this invention. For reasons which will appear more clearly hereafter, the retuning of the discriminator center frequency $f_0$ should be a linear function of the compensating error signal applied to the discriminator. The discriminator of FIG. 2 not only provides this linearity of retuning in response to the compensating error signal, but at the same time provides a highly linear discriminating action, whereby the detected signal accurately reflects the original modulation of the subcarrier.

To attain these characteristics, negative going pulses derived from the pulse generator 18, which includes differentiating network 33 and normally cut-off pentode 34, are applied to the anode of a normally non-conducting pentode 35. To couple these negative going pulses to the grid circuit of normally conducting pentode 36, a diode 38 connects the anode of pentode 35 with the input of a cathode follower 40, the output of the cathode follower 40 being coupled through a timing capacitor 41 to the control grid of the pentode 36. The cathode of the diode 38 is connected between voltage dividing resistors 43, 44 to have a fixed potential intermediate ground and the potential of the B— supply. Cathode resistor 45 for the cathode follower 40 provides a low impedance coupling via resistor 47 to output conductor 48 and also provides a low impedance discharge path from the timing capacitor 41 to the B— supply.

Paralleled resistor 50 and capacitor 51 couple the anode of the normally conducting pentode 36 back to the control grid of the normally non-conducting pentode 35. To bias the control grid of pentode 35 negatively to cutoff, resistor 50 together with anode resistor 53 for pentode 36 and grid resistor 54 for pentode 35 form a potential divider. Since the grid resistor 54 is connected to the B— supply bus, this potential divider serves normally to hold the control grid at a negative bias potential beyond cutoff.

The instant at which the timing capacitor 41 is charged sufficiently to restore the normally conducting pentode 36 to conduction may be varied by a bias potential applied to the control grid of pentode 36. The compensating error signal affords such a bias potential when applied at terminal 55 for coupling to the control grid of pentode 36 via fixed and adjustable resistors 56, 57. Satisfactory operation of the frequency discriminator for the reference frequency channel 11 is obtained, however, with terminal 55 grounded.

In a typical operation of this illustrative embodiment of the invention, the mixed subcarrier signals and reference frequency signal are reproduced from the record medium by the playback unit 10. The subcarrier signals are selectively entered into the *n* subcarrier discriminator channels 12 via the input filters 15 in accordance with their frequency pass bands. From the band pass input filters 15 are derived the respective subcarrier signals, which should be substantially free of any phase or amplitude distortion as a consequence of the fixed time delay and smooth attenuation characteristics of the filters. The subcarrier signals are amplified and then transformed by the limiter into square wave signals of fixed amplitude for application to the RC differentiating circuit 33 of the pulse generator 18. At the initiation of each square wave cycle, the pentode 34 of pulse generator 18 is driven to conduction by the positive peaks of the alternate polarity pulse train from differentiating circuit 33 and the resulting inverted signal coupled by pentode 34 from the differentiating circuit then provides a sharply falling negative pulse to the anode of normally non-conducting pentode 35 in the discriminator 19. So long as this negative going pulse is more positive than the junction of resistors 43, 44 the pulse will be conducted through diode 38 for application to the grid circuit of cathode follower 40. As the cathode follower 40 goes to non-conductance, the potential on the output line 48 will drop sharply to a fixed negative potential determined by the grid potential of the cathode follower. The drop in potential at the junction of resistors 45 and 47 is coupled via timing capacitor 41 to the control grid of pentode 36 to drive the same to cutoff. As the conduction through pentode 36 ceases, its anode will have a rise in potential which is coupled via capacitor 51 to the control grid of pentode 35, driving the same to saturation. Saturation of pentode 35 results in holding its anode and the anode of pulse generator 18 at a negative potential. Since the anode potential obtained with tube saturation is not well fixed, the diode 38 together with potential divider resistors 43, 44 serves to limit the negative excursion of the input signal to the cathode follower 40 at a fixed negative value. This in turn fixes the negative excursion of the output signal on line 48.

The discriminator 19 continues for an interval $T_1$ with the output conductor 48 at a fixed negative potential. This interval is determined by the period required for capacitor 41 to recharge through resistors 56, 57 to the bias potential established by the input to terminal 55. At an exact instant in the rise of potential applied to the control grid of pentode 36, the pentode will return to conductance, causing its anode to drop to a negative value. The negative going potential of this anode is coupled via capacitor 51 to the grid of pentode 35, driving the same to cutoff. The accompanying rise in the anode potential of pentode 35 is coupled via diode 38 and cathode follower 40 to the output conductor 48. Since this rise in potential has a substantially fixed limit, the conductor 48 likewise will rise to a substantially fixed potential. This fixed potential, which is positive, will continue for an interval $T_2$ terminated by the succeeding pulse arriving from the pulse generator 18.

The output conductor 48 is coupled to the low pass output filter 20 which, in a well-known manner, eliminates the subcarrier and passes a signal which varies with the integrated value of the square wave output from the discriminator. The integrated value, then, is a demodulated version of the subcarrier signal. This version is amplified to a suitable level for application to any desired utilization device.

In a similar manner the reference frequency signal is demodulated in the reference discriminator channel 11. The output of this reference channel, however, is not a data signal but an error signal representing the net speed deviations at any instant for the recording and playback of the recorded signal. This output is applied via the delay network 22 and each of cathode followers 31 to the tuning circuit input terminal 55 for each of the subcarrier discriminators 19. The signal applied at terminal 55 constitutes a bias signal on the timing grid of pentode 36 and therefore affects the duration of the otherwise constant time interval $T_1$. Since the center frequency $f_o$ may be defined as the frequency at which the variable interval $T_2$ equals the fixed interval $T_1$, it will be evident that the center frequency may be varied inversely with a variation in $T_1$. While in theory the center frequency $f_o$ is not linearly dependent upon the bias applied to the timing grid, in practice it has been found that the discriminator tuning can readily be changed as much as plus or minus 10% with deviations from linearity of less than plus or minus 1%. In fact, deviations from linearity of less than plus or minus 0.1% have been secured with as high as plus or minus 40% deviations in the center frequency $f_o$.

To understand the effectiveness of compensation achieved with the system of FIG. 1, the dependency of the discriminator output $E_o$ upon the fractional tape speed error $\epsilon$, as well as upon a modulating intelligence represented by $\Delta f$ may be represented as follows:

$$E_o = K\frac{(1+\epsilon)(f_o+\Delta f)-f_o}{f_o} \quad (1)$$

where K is a constant and $f_o$ is the center frequency as above defined. For the reference channel discriminator, $\Delta f$ is equal to zero. Therefore, the compensating signal $E_c$ derived from the reference discriminator channel is equal to $K\epsilon$, that is, it is proportional to the fractional tape speed error.

Since the center frequency $f_o$ can be varied in linear proportion to the output $E_c$ of the reference channel by application of this output to the timing grid, a compensated center frequency $f_{oc}$ may be obtained in accordance with the following expression:

$$f_{oc} = f_o(1+CE_c) = f_o(1+CK\epsilon) \quad (2)$$

This expression for $f_{oc}$, the compensated center of frequency, may be substituted in Equation 1 above, with the qualification that the first term in the numerator is not altered since it represents the actual frequency input to the discriminator. The equation is thus obtained:

$$E_o = K\frac{(1+\epsilon)(f_o+\Delta f) - f_o(1+CK\epsilon)}{f_o(1+CK\epsilon)} \tag{3}$$

If the constant C is chosen so that C is equal to the reciprocal of K, the factor $(1+\epsilon)$ can be factored from both the numerator and denominator of Equation 3. Doing so, one obtains the expression:

$$E_o = K\frac{\Delta f}{f_o} \tag{4}$$

By comparing Equations 1 and 4 it will be evident that the output signal $E_o$ obtained with compensation in accordance with the invention corresponds with the output of a discriminator having an input signal free of any tape speed error. Otherwise stated, so long as compensation is effected in accordance with Equation 2, this compensation entirely eliminates tape speed errors for all practical purposes.

To adjust the constant C to equality with the reciprocal of constant K in practice, a test record is prepared on which all of the subcarriers as well as the reference frequency signal are recorded. The subcarriers are not modulated but are instead held to their respective center frequencies. In preparing the recording, wow and flutter are deliberately introduced by rendering the record drive speed irregular. This may be accomplished readily with a magnetic tape drive, for example, by applying a strip of adhesive tape eccentrically to the tape drive capstan. Upon playback, each of the subcarrier signals as well as the reference frequency signal are modulated by wow and with flutter. Optimum compensation for each of the subcarrier channels is then obtained by adjusting the associated resistor 29 to obtain a minimum output signal and then adjusting the gain of the cathode follower 31 to again obtain a minimum output signal. Since each of the subcarrier signals is recorded at its center frequency, substantially a zero output is obtained from each of the subcarrier channels when these adjustments of the compensating circuit are properly made. The ease with which this system may provide substantially complete record speed compensation will therefore be apparent.

Figure 3:
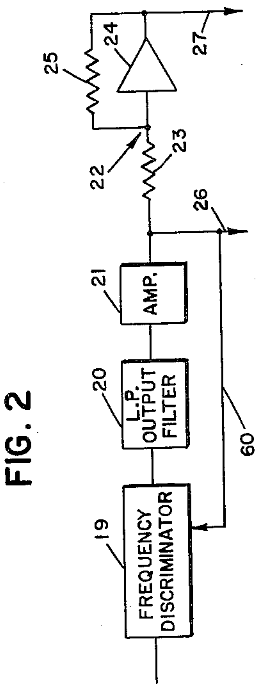
FIG. 3 is a block diagram of a portion of the system of FIG. 1, modified in accordance with another embodiment of the invention.

Should a discriminator circuit be employed lacking sufficient linearity between the timing grid bias signal and deviations in center frequency obtained with such signal, the necessary degree of linearity may be obtained with the modified system of FIG. 3. This system incorporates in the reference discriminator channel 11 a feedback circuit 60 extending from the output 26 of amplifier 21 to the timing circuit input terminal 55 of the frequency discriminator 19. Inverse feedback provided by this auxiliary feedback loop varies with any non-linearity in tuning of the reference discriminator and therefore compensates for like non-linearities in the subcarrier discriminators. This compensation is thus effected by automatically adjusting the amplitude of the compensating error signal $E_c$.

It will be evident that the described embodiments are susceptible to various modifications in form and design within the purview of the invention. For example, the subcarrier signals and the reference signals may be recorded on parallel tracks of the record medium for reproduction by separate transducers in the playback unit 10 having their outputs coupled to the respective discriminator channels. While both the circuit of the frequency discriminator 19 and that of the delay network 22 are particularly adapted for use with the system of FIG. 1, it will be evident that they too are subject to various modifications and adaptations. For example, in lieu of a frequency discriminator employing a monostable multivibrator, a phantastron-type discriminator may be employed, such as shown and described in the record of the National Telemetering Conference of March 20–22, 1953, in a report at pages 147–149 by M. G. Pawley entitled "A Low Frequency FM Discriminator of High Stability." With such discriminator, center frequency tuning may be achieved by varying the bias on the zero adjustment grid of the comparator tube in accordance with an error signal.

Accordingly, the invention is not to be limited to the specific embodiments disclosed herein but is defined by the appended claims.

I claim:

1. In a system for processing a time modulated intelligence signal recorded with a reference frequency signal, the combination comprising a frequency discriminator tuned to the reference frequency to derive an error signal representing record speed variations, a tunable frequency discriminator for demodulating the intelligence signal, and means for coupling said error signal with said tunable frequency discriminator to tune the same in proportion to record speed variations.

2. In a system for processing a frequency modulated intelligence signal recorded with a reference frequency signal, the combination comprising a frequency discriminator tuned to the reference frequency to derive an error signal representing record speed variations, a frequency discriminator for demodulating the intelligence signal, said intelligence signal discriminator including a tuning circuit for varying the center frequency to which it is tuned in response to an applied signal, and means for applying said error signal to said tuning circuit to vary the center frequency of the intelligence signal discriminator in proportion to record speed variations.

3. In a system for processing a frequency modulated intelligence signal recorded with a reference frequency signal, the combination comprising a frequency discriminator for each of said signals having the form of a monostable multivibrator, one of said multivibrators having its center frequency equal to the reference frequency to derive an error signal representing record speed variations, the other of said multivibrators including a biasing circuit for varying the center frequency to which it is tuned, and means for coupling said other multivibrator to said one multivibrator to apply said error signal to said biasing circuit.

4. In a system for processing a frequency modulated signal recorded with a reference frequency signal, the combination comprising a frequency discriminator channel for each of said signals including means for converting the corresponding signal into a train of actuating pulses, a monostable multivibrator actuated by said pulses to transfer from its stable to its unstable state, and a low pass filter for averaging the output of said multivibrator, the multivibrator in the reference signal channel being tuned to the reference frequency to provide an error signal output representing record speed variations, and means for coupling the low pass filter of the reference frequency channel to the multivibrator in the FM signal channel to control the center frequency tuning thereof in proportion to record speed variations.

5. In a system for processing a recorded frequency modulated signal mixed with a reference frequency signal, a frequency discriminator channel for each of said signals including a band pass filter having a substantially constant time delay through its pass band to filter out the corresponding signal, means for converting said filtered signal into a train of actuating pulses, a monostable multivibrator actuated by said pulses to transfer from its stable to its unstable state, and a low pass filter for averaging the output of said multivibrator, the multivibrator in the reference signal channel being tuned to the reference frequency to provide an error signal output representing record speed variations, and means including a delay network for coupling the low pass filter of the reference frequency channel to the multivibrator in the FM signal channel to control center frequency tuning thereof in proportion to record speed variations.

6. In a system for processing a recorded frequency modulated signal mixed with a reference frequency signal, the combination as defined in claim 5 wherein said delay network comprises a circle phase circuit adjustable to compensate for differences in delay time in said band pass filters.

7. In a system for processing a recorded frequency modulated signal mixed with a reference frequency signal, the combination as defined in claim 5 wherein said coupling means further includes variable gain amplifying means adjustable to compensate for record speed variations.

8. In a system for processing a plurality of frequency modulated signals with which a recorded reference frequency signal is mixed, the combination comprising a playback unit for reproducing said signals, a reference discriminator channel for said reference frequency signal and an FM discriminator channel for each of said FM signals, each of said discriminator channels including a band pass filter coupled to said playback unit and having a relatively smooth attenuation characteristic and a substantially constant time delay through its pass band to filter out the corresponding signal, means for converting the filtered signal into a train of actuating pulses, a monostable multivibrator having a tuning circuit, said multivibrator actuated by said pulses to transfer from its stable to its unstable state for a time interval determined by said tuning circuit, and a low pass filter for averaging the output of said multivibrator, the multivibrator in the reference discriminator channel being tuned to the reference frequency, whereby an error signal is derived from the corresponding low pass filter representing the fractional record speed error, and means for applying said error signal to the tuning circuit of each multivibrator in said FM discriminator channels to vary the center frequency tuning thereof in a manner compensating for record speed variations.

9. In a system for processing frequency modulated signals with which a recorded reference frequency signal is mixed, the combination as defined in claim 8 wherein said coupling means includes phase and amplitude adjusting means individual to each of said FM discriminator channels to adjust the compensation of record speed variations to the delay and amplitude characteristics of the respective channels.

10. In a system for processing a frequency modulated signal recorded with a reference frequency signal, a playback unit for reproducing said signals from a record medium, a frequency discriminator channel for each of said reproduced signals including means for converting the corresponding signal into a train of actuating pulses, a monostable multivibrator actuated by said pulses to transfer from its stable to its unstable state, and a low pass filter for averaging the output of said multivibrator, each of said multivibrators having a tuning circuit for varying the center frequency in response to a signal applied thereto, the multivibrator in the reference discriminator channel being tuned generally to said reference frequency signal and having its tuning circuit coupled to the output of the corresponding low pass filter to derive an inverse feedback signal therefrom, and means for coupling the low pass filter of the reference frequency channel to the multivibrator in the FM discriminator channel to control the center frequency thereof in proportion to record speed variations.

11. In a system for processing a frequency modulated signal recorded with a reference frequency signal, the combination comprising a frequency discriminator tuned to the reference frequency to derive an error signal representing record speed variations, a frequency discriminator for demodulating the intelligence signal, said discriminators each including a pair of electron tubes having their anodes and control grids cross-connected to comprise a monostable multivibrator in which current conduction is shifted for a time interval from one to another of said tubes in response to the application of a voltage pulse thereto, a biasing circuit connected with the control grid of the normally conducting tube, and means for coupling said error signal with the biasing circuit of said intelligence signal discriminator to adjust the time interval of its unstable state in inverse proportion to record speed variations.

12. In a system for processing frequency modulated signals recorded in timed relation with a reference frequency signal, the combination comprising a discriminator channel for each of said signals, each said discriminator channel including a band pass filter having a relatively smooth attenuation characteristic and a substantially constant time delay through its pass band selectively to pass one of said signals without phase or amplitude distortion, frequency discriminator means having a substantially linear discriminating action in such pass band and coupled with said filter for producing an output signal whose amplitude varies as a linear function of variations in the frequency of the selected signal, and means for applying the output signal from the reference frequency channel to each of the other channels in such timed relation as to fully compensate the frequency response of each discriminator means through the corresponding channel pass band for changes in frequency common to all of the signals applied to said filters.

13. In a system as defined in claim 12, the combination wherein said frequency discriminator means in each of said other channels has a tuning circuit to which said reference channel output signal is applied for varying the center frequency to which such discriminator is tuned in linear relation to such output signal.

14. In a system for processing a selected frequency modulated signal stored in timed relation to a reference frequency signal, the combination comprising a band pass filter having a substantially constant time delay through its pass band to pass the selected frequency modulated signal without phase distortion, frequency discriminator means responsive to frequency variations in said selected signal passed by said filter for producing a signal whose amplitude varies as a function of said frequency variations, and means for applying a delayed version of said reference frequency signal to said discriminator means to fully compensate the frequency response of said discriminator means through said pass band for identical changes in the frequencies of said frequency modulated signal and said reference frequency signal.

15. In a system as defined in claim 14, the combination wherein said discriminator means includes means responsive to said selected signal passed by said filter for producing a constant amplitude version thereof, means responsive to said constant amplitude version of said selected signal for producing pulses in timed relation to the frequency variations thereof, unbalanced trigger circuit means responsive to said pulses for transferring from its stable to its unstable state for a time interval, and integrating means coupled with said trigger circuit means for deriving said signal whose amplitude varies as a function of the frequency of said frequency modulated signal, said time interval for said trigger circuit means being linearly related to the version of said reference frequency signal applied thereto.

16. In a frequency modulation signaling system subject to error frequency shifts: means for transmitting an A.C. signal wave of one base frequency and frequency-modulated with a signal, and an A.C. reference wave of a second base frequency; means for receiving said signal and reference waves and separating them; means for detecting said separated reference wave and producing therefrom an output error potential proportional to departures of the received reference wave from its base frequency; signal-detecting means responsive to both said separated signal wave and said error potential for producing an output signal potential proportional to departures of the signal wave from its base frequency, and inversely proportional to said error potential; whereby frequency shift errors common to said signal and reference waves are reduced in the output of said signal-detecting means, said signal-detecting means comprising means responsive to said A.C. signal wave for generating a series of power pulses of amplitude and duration independent of the signal wave, but spaced apart in inverse relation to the frequency of the signal wave whereby the integrated energy content of the pulses is proportional to the frequency of the wave; pulse control means responsive to a potential applied thereto for varying the power content of said pulses; and means for applying said error potential to said pulse control means in such phase as to vary the energy content of said pulses in inverse ratio to the value of the error potential.

17. Apparatus according to claim 16 in which said pulse control means varies the duration of said pulses.

18. Apparatus according to claim 17 in which said pulses are substantially square, whereby variation of their length linearly varies the energy content thereof.

19. Apparatus according to claim 16 in which: said means for separating said signal and reference waves comprises separate filter means having different time delay characteristics; and said means for detecting said reference wave and producing therefrom said error potential includes auxiliary time delay means for equalizing the time delay in the error potential applied to said pulse control means with respect to the time delay in the signal wave applied to said pulse generating means.

20. In a frequency modulation signaling system subject to error frequency shifts: means for transmitting an A.C. signal wave of one base frequency and frequency-modulated with a signal, and an A.C. reference wave of a second base frequency; means for receiving said signal and reference waves and separating them; means for detecting said separated reference wave and producing therefrom an output error potential proportional to departures of the received reference wave from its base frequency; and signal-detecting means responsive to both said separated signal wave and said error potential for producing an output signal potential proportional to departures of the signal wave from its base frequency, and inversely proportional to said error potential; whereby frequency shift errors common to said signal and reference waves are reduced in the output of said signal-detecting means, said signal-detecting means comprising pulse generating means for generating a series of power pulses and integrating means for integrating said power pulse to produce said output signal potential; said pulse generating means being directly responsive to said separated signal wave and inversely responsive to the magnitude of said error potential whereby frequency shift errors common to said signal and reference waves are reduced in the output of said pulse generating means prior to integration of said output by said integrating means.

21. A system for processing first and second signals of different frequency comprising a frequency discriminator for demodulating the first signal and including a normally conducting electronic discharge device and a normally non-conducting electronic discharge device, each of said devices including a cathode, an anode and a control grid, means for applying fixed negative potentials to said cathodes, means for cross-connecting the anodes and control grids of said devices including a cathode follower having an anode, a cathode, a control grid and a cathode resistor for connecting its cathode to said potential applying means, a diode having its anode connected to the anode of said normally non-conducting device and its cathode connected to the control grid of said cathode follower, and a timing capacitor connected between the cathode of said cathode follower and the control grid of said normally conducting device, means for applying a positive potential to said anodes, means responsive to said first signal for applying actuating pulses at a corresponding frequency to the anode of said normally non-conducting device for reversing the conduction of said devices, means for applying a bias voltage varying in amplitude in accordance with the frequency of said second signal to the control grid of said normally conducting device, and means for deriving an output signal from said cathode resistor.

22. An electronic device for producing an output proportional to the ratio between the frequencies of two input signals comprising, means generating a voltage representing one of the two input signal frequencies, wave shaping means responsive to the other of the two input signals and generating a trigger signal of the same frequency as the other of the two input frequencies, a two tube multivibrator having a pair of anodes, a pair of cathodes and a pair of control electrodes, one of said anodes having said trigger signal applied thereto, capacitor means coupling said one anode with one of said control electrodes, capacitor discharge means associated with said capacitor means and controlling the discharge rate thereof, means connecting with both said cathodes and maintaining the potential thereof in substantially fixed relation, and one of said pair of control electrodes having said voltage applied thereto for time modulating the switching action of said multivibrator in cooperation with said capacitor means whereby the output obtained at one of said pair of anodes represents the ratio between the input signal frequencies.

23. An electronic device for producing an output representing the ratio between the frequencies of two input signals comprising, means generating a control voltage representing one of the two input signal frequencies, wave shaping means responsive to the other of the two input signals and generating a trigger signal of the same frequency as the other of the two input frequencies, a pair of electron discharge devices, each having an anode and a control electrode, a capacitor coupling the anode of one of the pair of electron discharge devices with the control electrode of the other of the pair of electron discharge devices, the anode of the one electron discharge device having said trigger signal applied thereto for effecting sequential operation of said electron discharge devices in response to each trigger signal, one of said control electrodes having said control voltage applied thereto for maintaining anode current flow through said one electron discharge device for a time period depending upon the magnitude of the control voltage and upon the discharge rate of said capacitor, and means connecting with the anode of one of said electron discharge devices for extracting the resulting pulse width modulated signal which represents the ratio between the two input signal frequencies.

24. An electron device for producing an output representing the ratio between the frequencies of two input signals comprising, means generating a control voltage representing one of the two input signal frequencies, wave shaping means responsive to the other of the two input signals and generating a trigger signal having the same frequency as the other of the two input frequencies, a pair of electron discharge devices, each having an anode and a control electrode, a capacitor coupling the anode of one of the pair of electron discharge devices with the control electrode of the other of the pair of electron discharge devices, the anode of the one electron discharge device having said trigger signal applied thereto for effecting sequential operation of said electron discharge devices in response to such trigger signal, one of said control electrodes having said control voltage applied thereto for maintaining anode current flow through said one electron discharge device for a time period proportional to the magnitude of the control voltage, de-coupling means electrically interposed between said wave shaping means and said pair of electron discharge devices and blocking the wave shaping means output only while said one electron discharge device is conducting, and means connecting with the anode of one of said electron discharge devices for extracting the resulting pulse width modulated signal which represents the ratio between the two input signal frequencies.

25. An electronic device for producing an output representing the ratio between the frequencies of two input signals comprising, means responsive to one of the two input frequencies and generating a control voltage representing the frequency thereof, wave shaping means responsive to the other of the two input signals and generating a trigger signal having the same frequency as the other of the two input signal frequencies, a pair of electron discharge devices, each having an anode, a cathode and a control electrode, a capacitor coupling the anode of one of the pair of electron discharge devices with the control electrode of the other of the pair of electron discharge devices, the anode of the one electrode discharge device having said trigger signal applied thereto for effecting sequential operation of said electron discharge devices in response to each trigger signal, one of said control electrodes having said control voltage applied thereto for maintaining anode current flow through said one electron discharge device for a time period proportional to the magnitude of the control voltage, means connecting with the cathodes of both said electron discharge devices for maintaining the voltage at the cathodes in substantially fixed relation and for maintaining the current flow therethrough substantially constant, decoupling means electrically interposed between said wave shaping means and said pair of electron discharge devices and blocking the wave shaping means output only while said one electron discharge device is conducting, and means connecting with the anode of one of said electron discharge devices for extracting the resulting pulse width modulated signal which represents the ratio between the two input signal frequencies.

26. An electronic device for producing an output signal proportional to the ratio between two input frequencies comprising, means responsive to one of the two input frequencies and generating a control voltage proportional thereto, wave shaping means responsive to the other of the two input frequencies and generating trigger signals at the same frequency as that of the input, a pair of electronic current control devices responsive to said trigger signals, energy storage means having a fixed time constant and coupling said current control devices as a one-shot multivibrator accomplishing one complete cycle of operation in response to the application of each trigger signal, one of the pair of current control devices having said control voltage applied thereto and establishing a bias level at which said current control devices are operatively responsive to said energy storage means for switching conduction from one device to the other whereby a width modulated pulse output is produced which represents the ratio between the two input frequencies, and de-coupling means electrically interposed between said wave shaping means and said electron discharge devices and blocking the wave shaping means output only while one of the pair of electron discharge devices is conducting.

27. An electronic device for producing an output proportional to the ratio between two input frequencies comprising, means generating a voltage proportional to one of the two input frequencies, means responsive to the other of the two input frequencies and generating recurring trigger pulses at a corresponding frequency, a pair of multi-electrode electronic switching devices coupled to operate as a one-shot multivibrator, means applying said trigger pulses to an electrode of one of said switching devices to effect actuation of the other switching device, and means applying said voltage to one of the electrodes of one of said switching devices and holding said other switching device actuated for a period of time varying substantially linearly with the magnitude of said voltage whereby a width modulated pulse is obtained which is proportional to the ratio between the two input frequencies.

28. An electronic device for producing an output representing the ratio between the frequencies of two input signals comprising, means generating a control voltage representing one of the two input signal frequencies, wave-shaping means responsive to the other of the two input signals and generating recurring trigger pulses of the same frequency as the other of the two input frequencies, a pair of electronic switching devices, energy storage means coupling said switching devices to operate as a one-shot multivibrator and normally establishing a biasing level urging one switching device to conduct in preference to the other switching device, means applying said trigger pulses to said one switching device through said energy storage means whereby said biasing level is changed to effect actuation of said other switching device, and means applying said voltage to one of said switching devices and holding said other switching device actuated for a period of time varying substantially linearly with the magnitude of said voltage whereby a width modulated pulse is obtained which is proportional to the ratio between the two input frequencies.

29. An electronic device for producing an output representing the ratio between two input signals comprising, means generating a control voltage representing one of the two input signals, wave-shaping means responsive to the other of the two input signals and generating recurring trigger pulses of a frequency representing the other of the two input signals, a one-shot pair of electronic current control devices arranged as a multivibrator accomplishing one complete cycle of operation in response to the application of each trigger pulse, said one-shot multivibrator including energy storage means having a time constant normally establishing a bias level urging one of said devices to conduct in preference to the other, said energy storage means being responsive to said trigger pulses for temporarily changing the bias level and effecting a switching action causing the other electronic current control device to conduct, and one of said electronic current control devices having said control voltage applied thereto and establishing a bias level at which said one device will again conduct whereby a width modulated pulse output is obtained proportional to the ratio between the two input signals.

30. An electronic device for producing an output signal proportional to the ratio between two input quantities comprising, means responsive to one of the two input quantities and generating a control voltage proportional thereto, wave-shaping means responsive to the other of the two input quantities and generating recurring trigger pulses at a frequency representing the other of the two input quantities, a pair of electronic current control devices, energy storage means having a fixed time constant normally establishing a bias level urging one of said current control devices to conduct in preference to the other, said energy storage means being responsive to said trigger pulses for temporarily changing the bias level and effecting a switching action causing the other electronic current control device to conduct, impedance means coupling said current control devices together and maintaining substantially constant current flow therethrough, and means applying said control voltage to one of said current control devices and establishing a bias level for the associated current control device proportional to the magnitude of said control voltage whereby a width modulated pulse output is produced which represents the ratio between the two input quantities.

31. An electronic device for producing an output representing the ratio between the frequencies of two input signals comprising, means generating a control voltage representing one of the two input signal frequencies, wave shaping means responsive to the other of the two input signals and generating a trigger signal of the same frequency as the other of the two input frequencies, a pair of electron discharge devices, each having an anode and a control electrode, a capacitor coupling the anode of one of the pair of electron discharge devices with the control electrode of the other of the pair of electron discharge devices, the anode of the one electron discharge device having said trigger signal applied thereto for effecting sequential operation of said electron discharge devices in response to each trigger signal, the control electrode of said other electron discharge device having said control voltage applied thereto for maintaining anode current flow through said one electron discharge device for a time period depending upon the magnitude of the control voltage and upon the discharge rate of said capacitor, and means connecting with the anode of said one electron discharge device for extracting the resulting pulse width modulated signal which represents the ratio between the two input signal frequencies.

32. An electronic device for producing an output representing the ratio between the frequencies of two input signals comprising, means generating a control voltage representing one of the two input signal frequencies, wave shaping means responsive to the other of the two input signals and generating a trigger signal having the same frequency as the other of the two input frequencies, a pair of electron discharge devices, each having an anode and a control electrode, a capacitor coupling the anode of one of the pair of electron discharge devices with the control electrode of the other of the pair of electron discharge devices, the anode of the one electron discharge device having said trigger signal applied thereto for effecting sequential operation of said electron discharge devices in response to such trigger signal, the control electrode of said other electron discharge device having said control voltage applied thereto for maintaining anode current flow through said one electron discharge device for a time period proportional to the magnitude of the control voltage, de-coupling means electrically interposed between said wave shaping means and said pair of electron discharge devices and blocking the wave shaping means output only while said one electron discharge device is conducting, and means connecting with the anode of said one electron discharge device for extracting the resulting pulse width modulated signal which represents the ratio between the two input signal frequencies.

33. An electronic device for producing an output signal proportional to the ratio between two input frequencies comprising, means responsive to one of the two input frequencies and generating a control voltage proportional thereto, wave shaping means responsive to the other of the two input frequencies and generating trigger signals at the same frequency as that of the input, a pair of electronic current control devices responsive to said trigger signals, energy storage means having a fixed time constant and coupling said current control devices as a one-shot multivibrator accomplishing one complete cycle of operation in response to the application of each trigger signal, one of the pair of current control devices having said control voltage applied thereto and establishing a bias level above the threshold bias level at which said current control devices are operatively responsive to said energy storage, means for switching conduction from one device to the other whereby a width modulated pulse output is produced which represents the ratio between the two input frequencies, and de-coupling means electrically interposed between said wave shaping means and said electron discharge devices and blocking the wave shaping means output only while one of the pair of electron discharge devices is conducting.

34. An electronic device for producing an output proportional to the ratio between two input frequencies comprising, means generating a voltage proportional to one of the two input frequencies, means responsive to the other of the two input frequencies and generating recurring trigger pulses at a corresponding frequency, a pair of multi-electrode electronic switching devices coupled to operate as a one-shot multivibrator, means applying said trigger pulses to an electrode of one of said switching devices to effect actuation of the other switching device, and means applying said voltage to one of the electrodes of said one switching device and holding said other switching device actuated for a period of time varying substantially linearly with the magnitude of said voltage whereby a width modulated pulse is obtained which is proportional to the ratio between the two input frequencies.

35. An electronic device for producing an output representing the ratio between the frequencies of two input signals comprising, means generating a control voltage representing one of the two input signal frequencies, wave-shaping means responsive to the other of the two input signals and generating recurring trigger pulses of the same frequency as the other of the two input frequencies, a pair of electronic switching devices, energy storage means coupling said switching devices normally establishing a biasing level urging one switching device to conduct in preference to the other switching device, means applying said trigger pulses to said one switching device through said energy storage means whereby said biasing level is changed to effect actuation of said other switching device, and means applying said voltage to said one switching device and holding said other switching device actuated for a period of time varying substantially linearly with the magnitude of said voltage whereby a width modulated pulse is obtained which is proportional to the ratio between the two input frequencies.

36. An electronic device for producing an output representing the ratio between two input signals comprising, means generating a control voltage representing one of the two input signals, wave-shaping means responsive to the other of the two input signals and generating recurring trigger pulses of a frequency representing the other of the two input signals, a one-shot pair of electronic current control devices arranged as a multivibrator accomplishing one complete cycle of operation in response to the application of each trigger pulse, said one shot multivibrator including energy storage means having a time constant normally establishing a bias level urging one of said devices to conduct in preference to the other, said energy storage means being responsive to said trigger pulses for temporarily changing the bias level and effecting a switching action causing the other electronic current control device to conduct, and one of said electronic current control devices having said control voltage applied thereto and establishing a bias level above the threshold bias level at which said one device will again conduct whereby a width modulated pulse output is obtained proportional to the ratio between the two input signals.

37. An electronic device for producing an output signal proportional to the ratio between two input quantities comprising, means responsive to one of the two input quantities and generating a control voltage proportional thereto, wave-shaping means responsive to the other of the two input quantities and generating recurring trigger pulses at a frequency representing the other of the two input quantities, a pair of electronic current control devices, energy storage means having a fixed time constant normally establishing a bias level urging one of said current control devices to conduct in preference to the other, said energy storage means being responsive to said trigger pulses for temporarily changing the bias level and effecting a switching action causing the other electronic current control device to conduct, impedance means coupling said current control devices together and maintaining substantially constant current flow therethrough, and means applying said control voltage to said one current control device and establishing a bias level above the threshold bias level for the associated current control device proportional to the magnitude of said control voltage whereby a width modulated pulse output is produced which represents the ratio between the two input quantities.

38. In a system for processing a frequency modulated intelligence signal recorded with a reference frequency signal, the combination comprising a frequency discriminator tuned to the reference signal frequency to derive an error signal representing record speed variations, a tuned frequency discriminator responsive to the frequency-modulated intelligence signal for demodulating the same, said intelligence signal discriminator including a tuning circuit for varying the frequency to which said intelligence signal discriminator is tuned in linear response to an applied signal, and means for applying said error signal to said tuning circuit for reducing errors in the demodulated intelligence signal due to said record speed variations.

39. In a system for processing a time modulated intelligence signal recorded with a reference frequency, the combination comprising an intelligence signal demodulator responsive to said intelligence signal and including a tuned pulse generator having a tuning circuit for varying the frequency to which said pulse generator is tuned in linear response to a signal applied to said circuit, and means coupled with said pulse generator for deriving a demodulated version of said intelligence signal, a reference frequency detector for deriving an error signal representing record speed variations, and means for applying said error signal to said tuning circuit of said intelligence signal demodulator in synchronous relation to the intelligence signal processed thereby to substantially reduce errors in the demodulated intelligence signal due to said record speed variations.

40. In a system for processing a frequency modulated signal recorded with a reference frequency signal, the combination comprising a frequency discriminator tuned to the reference frequency to drive an error signal representing record speed variations, a frequency discriminator for demodulating the intelligence signal, said discriminators including a normally conducting electron tube and a normally non-conducting electron tube, means for cross-connecting the anodes and control grids of said tubes including a cathode follower for coupling the anode of the normally non-conducting tube to the control grid of the normally conducting tube via a timing capacitor, a diode interposed between said last named anode and the control grid of said cathode follower to limit the negative excursion of the signal applied to said cathode follower grid, and means for applying said error signal to the control grid of said normally conducting tube of the intelligence frequency discriminator to bias the same.

References Cited in the file of this patent

UNITED STATES PATENTS

| | | |
|---|---|---|
| 2,541,378 | Nyquist | Feb. 13, 1951 |
| 2,668,283 | Mullin | Feb. 2, 1954 |
| 2,685,079 | Hoeppner | July 27, 1954 |
| 2,714,202 | Downing | July 26, 1955 |
| 2,807,797 | Shoemaker | Sept. 24, 1957 |
| 2,840,800 | Chester | June 24, 1958 |

UNITED STATES PATENT OFFICE

CERTIFICATE OF CORRECTION

Patent No. 3,017,616 January 16, 1962

Raymond A. Runyan

It is hereby certified that error appears in the above numbered patent requiring correction and that the said Letters Patent should read as corrected below.

Column 1, line 20, for "frequently" read -- frequency --; column 3, line 75, for "demodulation" read -- demodulated --; column 4, line 23, for "returning" read -- retuning --; column 6, line 73, strike out "of"; column 12, line 51, for "electron" read -- electronic --; column 13, line 15, for "electrode" read -- electron --; column 18, line 4, for "drive" read -- derive --.

Signed and sealed this 26th day of June 1962.

(SEAL)
Attest:

ERNEST W. SWIDER
Attesting Officer

DAVID L. LADD
Commissioner of Patents